US005254314A

United States Patent [19]

Yu et al.

[11] Patent Number: 5,254,314

[45] Date of Patent: Oct. 19, 1993

[54] MICROCENTRIFUGE TUBE

[75] Inventors: Zhilong Yu, Silver Spring; Zhipeng Yu, Laurel; Perry B. Newton, III, Arnold, all of Md.

[73] Assignee: International Mould Engineering, Arnold, Md.

[21] Appl. No.: 963,280

[22] Filed: Oct. 19, 1992

Related U.S. Application Data

[63] Continuation of Ser. No. 398,152, Aug. 24, 1989, abandoned.

[51] Int. Cl.[5] .............................................. G01N 21/03

[52] U.S. Cl. ...................................... 422/102; 422/58; 422/72; 215/237; 215/272; 215/306; 220/339; 220/307; 220/336

[58] Field of Search ........................... 422/58, 72, 102; 215/237, 272, 306; 220/82 R, 307, 336, 339, 375

[56] References Cited

U.S. PATENT DOCUMENTS 4,683,058 7/1987 Lyman et al. .................. 422/100 X
4,713,219 12/1987 Gerken et al. ..................... 422/102
4,755,356 7/1988 Robbins et al. .................... 422/102
4,761,379 8/1988 Williams et al. ................ 422/102 X
4,874,102 10/1989 Jessop et al. ........................ 215/273
4,956,298 9/1990 Diekmann ....................... 422/102 X

*Primary Examiner*—Lynn M. Kryza
*Attorney, Agent, or Firm*—Paul Lunn

[57] ABSTRACT

Disclosed is an improved microcentrifuge tube (10). One improvement is a recessed well (20) within the top of the the lid (16) of the tube into which an identifying disk (22) is placed. Another claimed improvement is an expanded lower circumference (25) of the lower portion of plug (24) extending down from the bottom of the top (16) of the tube and an inwardly directed protrusion (26) on the inner surface of the top portion of the tube such that the expanded circumference (25) at the lower portion of the plug (24) fits under the inwardly directed protrusion (26) when said plug is inserted into the opening of the tube thus securing the lid to the top of the tube. A third improvement is a flange (32) connected to and extending vertically down the lower surface of the rim (30) of the lid (16), said flange being wide enough and long enough to prevent an investigator's thumb from coming into contact with the outer edge of the opening of the tube and with the outer surface of the plug (24) when the investigator is removing the lid from the tube.

2 Claims, 1 Drawing Sheet

MICROCENTRIFUGE TUBE

This is a continuation of co-pending application Ser. No. 07/398,152 filed on Aug. 24, 1989, now abandoned.

FIELD OF THE INVENTION

The present invention is in the field of laboratory equipment.

BACKGROUND OF THE INVENTION

The present invention is an improved microcentrifuge tube. Microcentrifuge tubes are small conical tubes. The top opening of the tube generally has a lid which is connected to the top of the tube by means of a plastic strip or hinge. These tubes are widely used by molecular biologists and biochemists. Despite their wide use, there are problems associated with these tubes. The tubes are difficult to distinguish from each other especially when they are in a centrifuge. The lids of the tubes very often do not remain securely fastened. Also contaminates such as RNases and proteases can be introduced into the tube by the investigators when the investigator removes the lid with his fingers or thumb. These contaminants can totally break down RNA or proteins thus ruining an experiment.

SUMMARY OF THE INVENTION

The present invention is an improved test tube. The test tube is comprised of a tube having a sealed bottom end, an open top end and a lid which seals the top opening of the tube. The present invention is comprised of several improvements to the above-described test tube. A first improvement is an improved lid in which the top of the lid has a recessed well into which an identifying disk can be placed for easy identification of the tube especially when the tube is in a centrifuge.

A second improvement is a means for securing the lid so it does not pop open when it is inserted in the opening of the tube. The lid has a central plug which extends downwardly from the bottom of the lid into the opening of the tube, the improvement is an expanded circumference of the lower portion of the plug and a protrusion which protrudes inwardly about the circumference of the inner wall of the tube such that the expanded circumference of the lower plug fits beneath the inwardly projecting rim when the lid is inserted into the the tube thus securely fixing the lid into the top of the test tube.

A third improvement is a vertical flange which is attached to the bottom side of the rim of the top of the lid such that the flange extends downwardly over the edge of a portion of the outer wall of the tube preventing contact of the investigator's fingers and thumbs with the edge of the tube and with the outer surface of the central plug extending from the bottom surface of the lid. Thus the risk of contamination of the reagents within the tube by RNases and proteases from the investigator's fingers or thumbs is prevented when the investigator opens or closes the tube. The flange should be long enough to extend below the outer edge of the opening of the tube. Preferably, the length of the flange should be as long as or longer than the length of the central plug which extends downwardly from the bottom of the lid. The flange should be wide enough so an investigator's thumb will only come into contact with the flange and not the edge of the opening of the tube or with the outer surface of the central plug when the investigator removes the lid from the tube. The flange should preferably be at least approximately three sixteenths (3/16) of an inch (4.7 mm) wide.

BRIEF DESCRIPTION OF THE DRAWINGS

The invention is illustrated in the accompanying figures wherein like reference numbers represent like elements and in which.

DETAILED DESCRIPTION OF THE INVENTION

Figure 2:
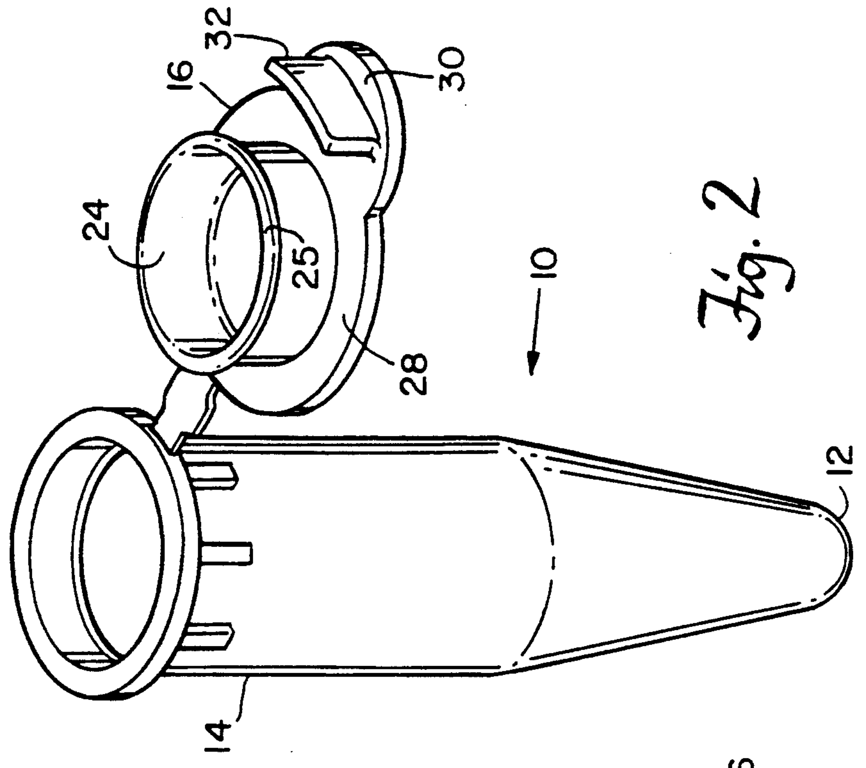
FIG. 2 is a perspective view of the microcentrifuge tube with the lid opened showing the bottom of the improved lid of the present invention.
Figure 3:
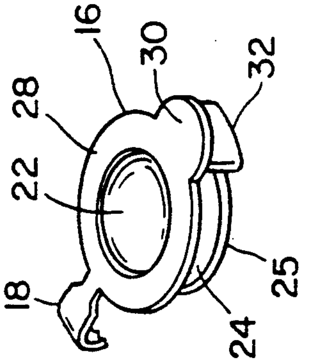
FIG. 3 is a top view in perspective of the improved lid of the present invention.
Figure 1:
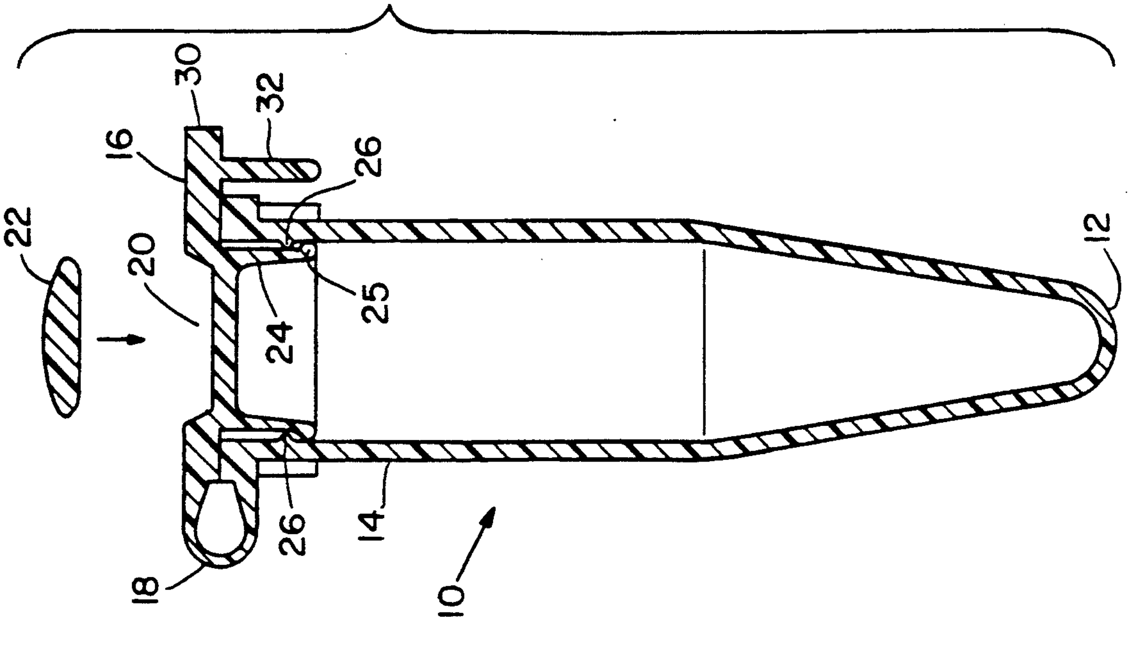
FIG. 1 is a longitudinal cross-section of a microcentrifuge tube showing the improvements of the present invention.

FIG. 1 is a longitudinal cross-section and FIG. 2 is a perspective view of a plastic microcentrifuge tube 10 showing the improvements of the present invention. Microcentrifuge tube 10 has a narrowed, pointed sealed bottom 12 and an opened upper section 14 which has a lid 16 inserted into the opening of upper section 14. Lid 16 is hingably connected to the upper section 14 of tube 10 by means of a plastic strip 18. The top of lid 16 contains a recessed well 20 into which an identification disk 22 can be inserted as is shown in FIG. 3. The identification can be of several different types. The disk can be color coded, numbered or lettered to name just a few possibilities.

The bottom of lid 16 has a central circular plug 24 which extends downwardly and inserts into the opening of tube 10. The lower portion of plug 24 expands out to an expanded circumference 25 beyond the circumference of the upper portion of the plug. The upper inner surface of the tube has an inward protrusion 26 which circles the upper inner surface such that when plug 24 is inserted into the opening of tube 20 expanded circumference 25 fits beneath inward protrusion 26 thus securing lid 16 in the opening of tube 20.

The top of lid 16 has a rim 28 which extends over the edges of the top of tube 10. Rim 28 has a lip 30 which extends out beyond the rest of rim 28. Extending vertically, downwardly from lip 30 is a flange 32. The presence of flange 32 helps to prevent contamination of tube 10 from the investigator's fingers and thumbs because it prevents contact between the investigator's fingers and thumbs with the edge of the opening of tube 10 and with the outer surface of central plug 24 when the investigator opens or closes the tube. Flange 32 should be long enough to extend below the outer edge of the opening of the tube. Preferably, the length of flange 32 should be as long as or longer than the length of central plug 24. Flange 32 should also be wide enough so an investigator's thumb will only come into contact with the flange and not with the outer edge of the opening of the tube and not with the outer surface of central plug 24 when the investigator removes the lid from the tube. The flange should preferably be at least approximately three sixteenths (3/16) of an inch (4.7 mm) wide.

While this invention has been described with respect to certain embodiments, it is not so limited, and it should be understood that variations and modifications thereof may be made which are obvious to those skilled in the art without departing from the spirit or scope of the invention.

We claim:

1. An improved lid for a test tube, said test tube having a sealed bottom, an open top having inner and outer edges, said tube also having an inner surface and an outer surface, and a lid shaped to fit into the open top of the tube, said lid having an upper surface and lower surface, said lid also having a rim attached to the upper surface of the lid, said rim extending over the top of the test tube when the lid is covering the test tube, said rim having an upper surface and a lower surface, said lid having top and bottom surfaces and said lid having a plug connected to and extending from the bottom surface of said lid, said plug having an inner and outer surface, an upper portion attached to the bottom surface of the lid and a lower portion distal from said bottom surface, said plug being insertable into the tube when the lid is shut onto the open top of the tube, wherein the improvement comprises:

a flange connected to and extending vertically downwardly from the lower surface of the rim of the lid, said flange being at least approximately three sixteenths (3/16) of an inch (4.7 mm) wide and wherein the flange is as long as or longer than the plug.

2. An improved test tube as recited in claim 1, wherein the lid is hingeably connected to the top of the test tube.

* * * * *